3,000,856
POLY-α-OLEFIN COMPOSITION STABILIZED AGAINST ULTRAVIOLET LIGHT DETERIORATION
Gordon C. Newland and John W. Tamblyn, Kingsport, Tenn., assignors to Eastman Kodak Company, Rochester, N.Y., a corporation of New Jersey
No Drawing. Filed June 15, 1959, Ser. No. 820,130
5 Claims. (Cl. 260—45.95)

This invention relates to the stabilization of poly-α-olefin compositions. Preferred embodiments of the invention relate to the stabilization of polyethylene and polypropylene compositions against deterioration resulting from exposure to sunlight or ultraviolet light with a novel synergistic combination of stabilizers.

Poly-α-olefins such as polyethylene, polypropylene and the like are subject to photo-oxidation when exposed to sunlight. This oxidation is characterized in its earlier stages by the breaking of the polymer chain and the formation of carbonyl groups in the polymer's molecule. As the oxidation continues, the polymer cracks and loses tensile strength to the point of mechanical failure. A number of so-called ultraviolet inhibitors are known which inhibit the photo-degradation of many polymers, resins or plastics. However, many effective stabilizers for halogen-containing polymers such as polyvinyl chloride, polyvinylidene chloride and the like are not effective stabilizers in poly-α-olefins, as stabilizers in halogen-containing polymers function essentially as hydrogen halide scavengers while stabilizers in halogen-free poly-α-olefins do not serve this function. Likewise, ultraviolet inhibitors which are eminently suited for such cellulosic esters as cellulose triacetate, cellulose acetate butyrate and the like are not necessarily effective ultraviolet inhibitors for poly-α-olefins. Hence, it is highly unpredictable as to whether a given ultraviolet inhibitor compound will be effective in poly-α-olefin compositions.

At least as unpredictable is the determination of whether or not a given combination of two or more stabilizer compounds will synergize to produce a stabilizing effect in poly-α-olefins that is greater than the additive effect of the individual stabilizers. We know of no method whereby a combination of stabilizers can be predicted to be synergistic stabilizers for poly-α-olefin compositions short of actually testing the combination in a poly-α-olefin composition, even though the individual components comprising the combination may be well-known stabilizers for various polymers, resins or plastics including poly-α-olefin compositions.

Apart from the fact that it is an unexpected scientific discovery when two stabilizers are found that will synergize with each other in poly-α-olefin compositions, there are certain practical commercial advantages that oftentimes accompany the use of such combinations of stabilizers as distinguished from the use of a single stabilizer material or compound. For example, one of the stabilizers of the combination might be costly or difficult to acquire in commercial amounts while the other stabilizer of the combination might be relatively cheap and readily available. In such a situation it is desirable to be able to substitute the cheaper stabilizer for a portion of the more expensive stabilizer, and still be able to obtain good stabilization through the synergism of the stabilizer combination. Thus, it is highly desirable in the poly-α-olefin art to have available synergistic combinations of two or more stabilizers.

It is an object of this invention to provide a new synergistic combination of stabilizers for poly-α-olefin compositions.

It is another object of this invention to provide novel polyethylene and polypropylene compositions containing a synergistic combination of compounds that improves the stability of the polyethylene and polypropylene compositions against deterioration resulting from exposure to sunlight or ultraviolet light.

It is also an object of this invention to provide novel poly-α-olefin compositions of improved stability in thin film form.

Other objects of the invention will be apparent from the description and claims that follow.

The present invention comprises poly-α-olefin compositions having incorporated therein a stabilizer combination comprising 2,2'-methylenebis(6-methylcyclohexyl-p-cresol) and a 2-hydroxy-5-alkylbenzophenone. This combination of stabilizers imparts to poly-α-olefin compositions a high degree of stability to deterioration resulting from exposure to ultraviolet light, and which improved stability is substantially greater than the additive effect of the individual stabilizers comprising the subject stabilizer combination. Hence, the stabilizer combination of the invention is termed in the art a "synergistic" combination.

The 2,2'-methylenebis(6-methylcyclohexyl-p-cresol) component of the subject stabilizer combination has the following formula:

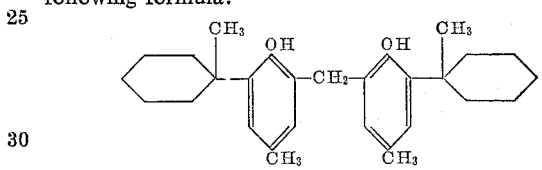

The 2-hydroxy-5-alkylbenzophenone component of the subject stabilizer combination has the following formula:

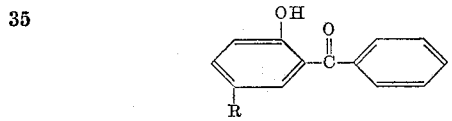

wherein R is an alkyl radical containing 4 to 12 carbon atoms, including both straight and branched carbon chain alkyl radicals. Typical substituents for R include n-butyl, isobutyl, n-amyl, n-hexyl, n-heptyl, n-octyl, 1,1,3,3-tetramethylbutyl, 2,2-dimethylhexyl, n-nonyl, n-decyl, n-undecyl, n-dodecyl, and the like.

The combination of 2,2'-methylenebis(6-methylcyclohexyl-p-cresol) and 2-hydroxy-5-alkylbenzophenone as described above can be used to stabilize a wide variety of poly-α-olefin compositions against deterioration resulting from exposure to ultraviolet light. Any of the normally solid polymers of α-monoolefinic aliphatic hydrocarbons containing 2 to 10 carbon atoms can be stabilized in accordance with the invention. The subject stabilizer combination is preferably used in polyethylene and polypropylene, although such poly-α-olefins as poly 4-methylpentene-1, poly 3-methylbutene-1, poly 3,3-dimethyl-butene-1, poly pentene-1, and related homologues are included in the invention. Both the so-called "low density" and "high density" poly-α-olefin compositions can be stabilized in accordance with the invention. "Low density" polyethylene usually has a density of about .91 to .93 and "high density" polyethylene usually has a density of about .94 to .97, for example. Densities of other poly-α-olefins are known to the art. Reference is made to Fawcett et al. U.S. Patent No. 2,153,553, granted April 11, 1939, and to copending applications Coover U.S. Serial No. 559,536, filed January 17, 1956, now abandoned, and Coover et al. U.S. Serial No. 724,904, filed March 31, 1958, with regard to the preparation of various poly-α-olefin compositions that can be stabilized against ultraviolet deterioration with the subject stabilizer combination. The subject stabilizer combination can be used as an ultraviolet inhibitor for the more common solid resinous poly-α-olefin compositions having average molecular weights of at least 15,000 and more usually at least 20,000, as well as the so-called poly-α-olefin waxes having lower molecular weights such as 3,000 to 12,000.

The amount of the subject stabilizer combination employed in poly-α-olefin compositions in accordance with the invention can be widely varied, the stabilizing amount of this combination usually varying with the particular use to which the poly-α-olefin is to be put. Concentrations of the combination of at least .001% are used, with concentrations of .001% to 10% being generally used, and with concentrations of .005% to 5% being preferably used, the concentration being based on the weight of the poly-α-olefin. The weight ratios of the two stabilizers comprising the subject synergistic combination likewise can be varied. We generally utilize the combination of the subject two stabilizers at a weight ratio of 2,2'-methylenebis(6-methylcyclohexyl-p-cresol) to the 2-hydroxy-5-alkylbenzophenone in the range of 1/30 to 30/1, and preferably 1/10 to 10/1.

The stabilizer combination of the invention can be incorporated or blended into poly-α-olefin compositions by any of the conventional methods used for blending such materials into polymers, resins or plastics. Typical of such methods that can be suitably employed include milling on heated rolls, deposition from solvents, and dry-blending. The stabilizers of the invention can be incorporated separately or together into the poly-α-olefin composition.

The stabilizer combination of the present invention lends to poly-α-olefin compositions improved stability, and more specifically, improved stability against deterioration resulting from exposure to sunlight or untraviolet light. Thus, poly-α-olefins stabilized in accordance with the invention have an extended life expectancy and can be used more effectively than unstabilized poly-α-olefins for a wide diversity of uses, including outdoor uses requiring prolonged exposure to the elements. Poly-α-olefins stabilized in accordance with the invention can be cast, extruded, rolled or molded into sheets, rods, tubes, piping filaments and other shaped articles, including widely used films of the polymer about 0.5 to 100 mils in thickness. The present composition can be used for coating paper, cloth, wire, metal foil, glass fiber fabrics, synthetic and natural textiles and other such materials. Likewise, small amounts of other additives such as other polymers, resins or plastics, as well as other stabilizers or inhibitors, that are commonly added to poly-α-olefins for specific uses, and that are not deleterious to the effectiveness of the present synergistic combination, can be used in the poly-α-olefin compositions of the invention.

The invention is illustrated by the following examples of preferred embodiments thereof.

EXAMPLE 1

Polyethylene samples containing .5% by weight of 2,2'-methylenebis(6-methylcyclohexyl-p-cresol) plus 1% by weight of 2-hydroxy-5-n-octylbenzophenone, as well as these two stabilizers individually and a control containing no stabilizer additive for comparative purposes, were subjected to an outdoor weathering test. The various additives were incorporated into polyethylene having an average molecular weight of about 30,000 and a density of 0.918 by milling on heated rollers in accordance with usual practice. Thereafter the polyethylene was compression molded into films about 60 mils in thickness. Samples of the resulting films containing the various additives and the control sample containing no additive were exposed to outdoor weathering on a rack facing south at an angle with the horizontal of 36.5° at Kingsport, Tenn. The progress of the deterioration due to exposure of the various samples was followed by determining the carbonyl formation as measured by infrared absorption in the 5.82μ region. The determination of the carbonyl increase in poly-α-olefin polymers gives an early and reliable indication of the breaking down of the polymer. Reference is made to the following two references concerning the determination of carbonyl content by infrared measurement: Rugg, Smith and Bacon, J. Polymer Sci., 13, 535(1954), and Cross, Richards and Willis, Discussions Faraday Soc., No. 9, 235(1950). The times in months required for the formation of 10 arbitrary units of carbonyl, enough to cause substantial deterioration in the physical properties of the poly-α-olefin composition, were recorded and summarized in Table 1 below.

*Table 1*

| Additive | Exposure Time in Months to Produce 10 Units of Carbonyl |
|---|---|
| (1) None | 1 |
| (2) .5% 2,2'-Methylenebis(6-methylcyclohexyl-p-cresol) | 2 |
| (3) 1% 2-Hydroxy-5-n-octylbenzophenone | 14 |
| (4) .5% 2,2'-Methylenebis(6-methylcyclohexyl-p-cresol)+1% 2-Hydroxy-5-n-octylbenzophenone | >25 |

As can be observed from the data set out in Table 1, the combination of 2,2'-methylenebis(6-methylcyclohexyl-p-cresol) and the 2-hydroxy-5-n-octylbenzophenone is a stabilizer combination which has a stabilizing effect greater than the additive or aggregative effect of these individual stabilizers. No detectable amount of either of the stabilizers of the combination exuded from the polyethylene during the course of the exposure test.

EXAMPLE 2

A .5% by weight portion of 2,2'-methylenebis(6-methylcyclohexyl-p-cresol) in combination with a 1% by weight portion of 2-hydroxy-5-n-octylbenzophenone incorporated into polypropylene having an average molecular weight of about 110,000 and a density of 0.917, when prepared in test samples and exposed to weathering as described in Example 1, show a synergistic effect in stabilizing the polypropylene against deterioration resulting from the exposure.

EXAMPLE 3

Polyethylene samples containing 2,2'-methylenebis(6-methylcyclohexyl-p-cresol) and 2-hydroxy-5-n-octylbenzophenone, individually and in combination, were prepared and exposed to 14 months of outdoor weathering as described in Example 1. The exposed samples were tested for deterioration resulting from the weathering by elongation measurements of 2.5 x .5 inch test strips on an Instron Tensile Tester at a rate of stretch of 2,000% per minute. The test samples were conditioned one week at 73° F. at a relative humidity of 50%. The results of the tests are summarized by the data set out in Table 2 below.

*Table 2*

| Additive | Percent Original Elongation Retained After 14 Months' of Exposure |
|---|---|
| (1) None | 9 |
| (2) .5% 2,2'-Methylenebis(6-methylcyclohexyl-p-cresol) | 10 |
| (3) 1% 2-Hydroxy-5-n-octylbenzophenone | 42 |
| (4) .5% 2,2'-Methylenebis(6-methylcyclohexyl-p-cresol)+1% 2-Hydroxy-5-n-octylbenzophenone | 100 |

As evidenced from the elongation measurements described above, 2,2'-methylenebis(6-methylcyclohexyl-p-cresol) and 2-hydroxy-5-n-octylbenzophenone cooperate in poly-α-olefin compositions to produce a synergistic stabilizing effect.

EXAMPLE 4

Preparation of 2,2'-methylenebis(6-methylcyclohexyl-p-cresol). Into a 1-l., round-bottomed, 3-necked flask fitted with a reflux condenser, a mechanical stirrer and a thermometer were placed 114.2 g. (1.0 mole) of 1-methylcyclohexanol, 140.6 g. (1.3 moles) of p-cresol and 460 ml. of phosphoric acid (85%). The mixture was stirred continuously and the temperature was raised to 110° C. After maintaining these conditions for 7 hours the mixture was cooled and was diluted with 1380 ml. of water. The drowned mixture was extracted with four 200-ml. portions of ethyl ether. The combined ether extracts were dried over 40 g. of anhydrous magnesium sulfate. Most of the ether was removed from the crude product by distillation on a steam bath. The residue weighed 265 g. This residue was subjected to distillation under reduced pressure. The remaining ether was removed at about 150 mm. of mercury. The residual oil was distilled to give 97 g. of unchanged p-cresol boiling at 67–73° C./2.6–4.1 mm. of mercury and 112 g. (55%) of the 4-methyl-2-(1-methylcyclohexyl)phenol boiling at 135–139° C./4.0–4.4 mm. The distilled product readily crystallized to long snow-white crystals.

*Analysis.*—Calcd. for $C_{14}H_{20}O$: C=82.30%, H=9.8%: Found C=81.75%, H=9.89%.

Into a 500-ml., round-bottomed, 3-necked flask fitted with a reflux condenser, a mechanical stirrer and a gas delivery tube were placed 91.7 g. (0.45 mole) of the 4-methyl-2-(1-methylcyclohexyl)phenol, 7.1 g. (0.225 mole of paraformaldehyde (95%) and 65 ml. of glacial acetic acid. Stirring was begun and anhydrous hydrogen chloride was passed into the mixture through the delivery tube. The temperature of the mixture increased gradually and after about 33 minutes the product separated as a crystalline magma. Stirring was discontinued and the mixture was allowed to stand for one hour. The mixture was thinned by the addition of 50 ml. of glacial acetic acid and was then transferred to a beaker where the lumps were broken up. The product was isolated by suction filtration followed by washing on the filter with acetic acid. The crude product weighed 54.4 g. This was recrystallized from hexane to give 50.9 g. (54%) of pure, white crystals of 2,2'-methylenebis(6-methylcyclohexyl-p-cresol) which melted sharply at 139° C.

Analysis.—Calcd. for $C_{29}H_{40}O_2$: C=82.81%, H=9.59%: Found C=83.03%, H=9.51%.

EXAMPLE 5

Preparation of 2-hydroxy-5-n-octylbenzophenone. Boron trifluoride (20 g.) was passed into a suspension of 25 g. (0.11 mole) or p-n-octylphenol and 20 g. (0.16 mole) of benzoic acid in 100 ml. of tetrachloroethane. The mixture was heated on a steam bath for 5 hours and then poured into 500 ml. of 10% aqueous sodium acetate solution. The organic layer was separated and the tetrachloroethane was removed by steam distillation to give the crude product as a viscous yellow oil. This was distilled at reduced pressure to give 22 g. of 2-hydroxy-5-n-octylbenzophenone as a yellow oil, b.p. 175–180° C. at 12 mm. of mercury.

*Analysis.*—Calcd. for $C_{21}H_{26}O_2$: C=81.4%, H=8.39%: Found, C=81.8%, H=8.31%.

The present invention thus provides novel poly-α-olefin compositions having improved stability against deterioration resulting from exposure to ultraviolet light, and particularly it provides novel synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

We claim:

1. A solid poly-α-olefin composition comprising a poly-α-olefin selected from the group consisting of polyethylene and polypropylene containing .001% to 10% by weight based on said poly-α-olefin of a stabilizer combination comprising 2,2'-methylene-bis(6-methylcyclohexyl-p-cresol) and 2-hydroxy-5-octylbenzophenone.

2. A solid poly-α-olefin composition comprising polyethylene containing .001% to 10% by weight based on said polyethylene of a stabilizer combination comprising 2,2'-methylenebis(6-methylcyclohexyl-p-cresol) and 2-hydroxy-5-n-octylbenzophenone, the weight ratio of said 2,2'-methylenebis(6-methylcyclohexyl-p-cresol) to said 2-hydroxy-5-n-octylbenzophenone being in the range of 1/30 to 30/1.

3. A solid poly-α-olefin composition comprising polypropylene containing .001% to 10% by weight based on said polypropylene of a stabilizer combination comprising 2,2'-methylenebis(6-methylcyclohexy-p-cresol) and 2-hydroxy-5-n-octylbenzophenone, the weight ratio of said 2,2'-methylenebis(6-methylcyclohexyl-p-cresol) to said 2-hydroxy-5-n-octylbenzophenone being in the range of 1/30 to 30/1.

4. A solid poly-α-olefin composition in film form .5 to 100 mils in thickness comprising polyethylene having an average molecular weight of at least 15,000 and containing .005% to 5% by weight based on said polyethylene of a stabilizer combination comprising 2,2'-methylenebis(6-methylcyclohexyl-p-cresol) and 2-hydroxy-5-n-octylbenzophenone, the weight ratio of said 2,2'-methylenebis(6-methylcyclohexyl-p-cresol) to said 2-hydroxy-5-n-octylbenzophenone being in the range of 1/10 to 10/1.

5. A solid poly-α-olefin composition in film form .5 to 100 mils in thickness comprising polypropylene having an average molecular weight of at least 15,000 and containing .005% to 5% by weight based on said polypropylene of a stabilizer combination comprising 2,2'-methylenebis(6-methylcyclohexyl-p-cresol) and 2-hydroxy-5-n-octylbenzophenone, the weight ratio of said 2,2'-methylenebis(6-methylcyclohexyl-p-cresol) to said 2-hydroxy-5-n-octylbenzophenone being in the range of 1/10 to 10/1.

References Cited in the file of this patent

UNITED STATES PATENTS

| | | |
|---|---|---|
| 2,852,488 | Clark et al. | Sept. 16, 1958 |
| 2,887,466 | Lappin et al. | May 19, 1959 |

FOREIGN PATENTS

| | | |
|---|---|---|
| 797,344 | Great Britain | July 2, 1958 |